Figure 1:
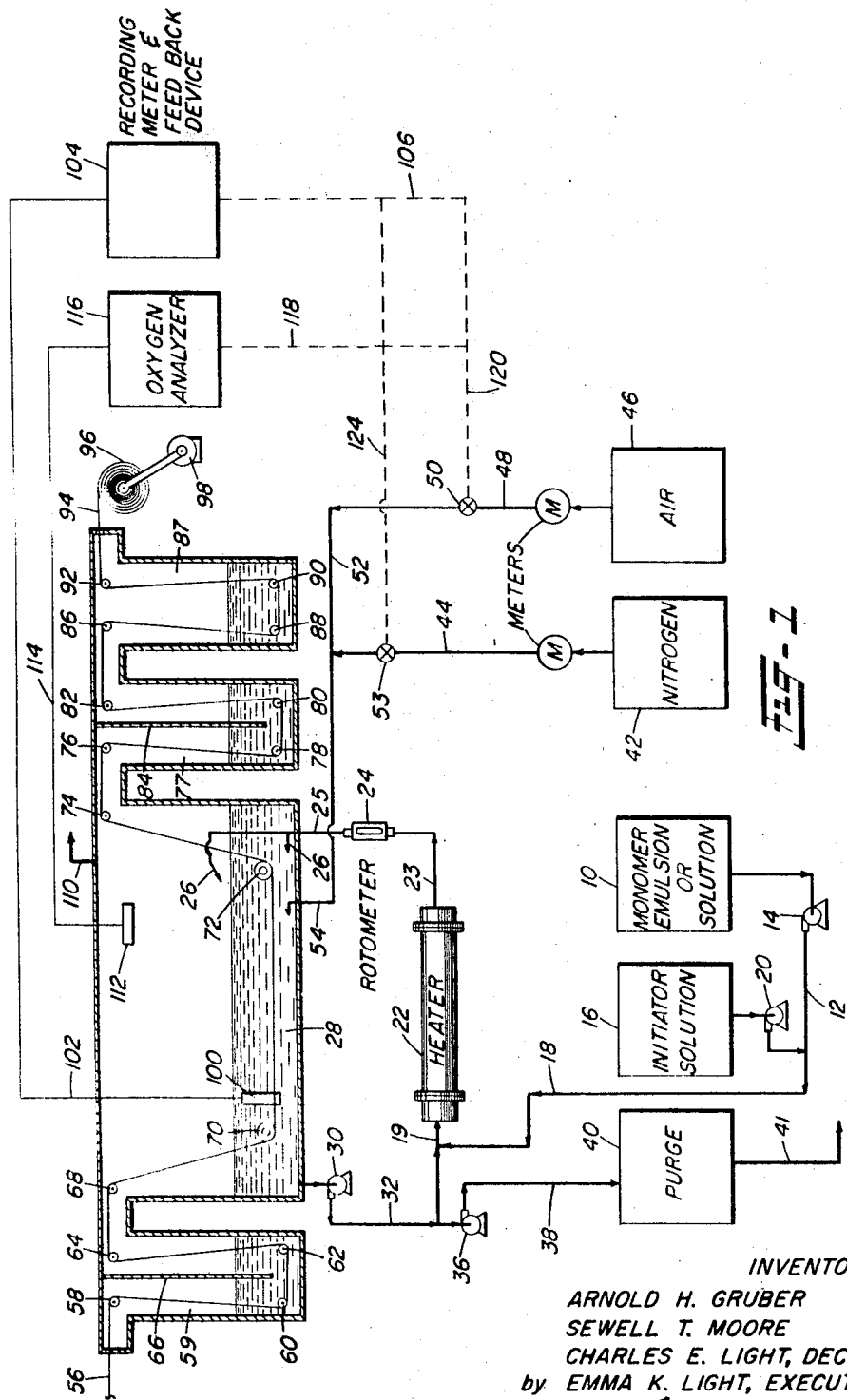

July 15, 1969        A. H. GRUBER ET AL        3,455,643
CONTINUOUS VINYL GRAFTING OF CELLULOSE
Original Filed Sept. 29, 1961                2 Sheets-Sheet 1

INVENTORS
ARNOLD H. GRUBER
SEWELL T. MOORE
CHARLES E. LIGHT, DECEASED
by EMMA K. LIGHT, EXECUTRIX

BY Frank M. Van Riet
ATTORNEY

United States Patent Office 3,455,643
Patented July 15, 1969

3,455,643
CONTINUOUS VINYL GRAFTING OF CELLULOSE
Arnold Harvey Gruber, Lexington, Mass., Sewell Trezevant Moore, Stamford, Conn., and Charles Ellsworth Light, deceased, late of Darien, Conn., by Emma K. Light, executrix, Darien, Conn., assignors to American Cyanamid Company, Stamford, Conn., a corporation of Maine
Original application Sept. 29, 1961, Ser. No. 141,650, now Patent No. 3,130,076, dated Apr. 9, 1964. Divided and this application Aug. 27, 1963, Ser. No. 305,005
Int. Cl. D06m 1/00
U.S. Cl. 8—116                                    1 Claim This application is a divisional application of Ser. No. 141,650, filed Sept. 29, 1961, now Patent No. 3,130,076.

This invention relates to an apparatus suitable for use in the continuous vinyl grafting of cellulosic webs. More particularly, this invention relates to an apparatus for the continuous grafting of a vinyl monomer onto a cellulosic backbone, such as paper, cotton, etc.

Vinyl grafting of cellulosic webs is a very intricate process involving primarily the formation of free-radical sites on the cellulosic web utilizing various initiators and subsequently the polymerization of the vinyl monomer onto the web at the free radical sites. In so doing, polymeric chains are grafted onto the cellulosic web backbone and the utilized initiator is reduced to an inactive form. During the reaction, several side reactions can occur. Of particular concern is homopolymerization of the vinyl monomer which results in the formation of non-grafted polymers, and may necessitate the cessation of operation to rid the system of these homopolymers. Other side reactions which may occur are hydrolysis of the vinyl monomer, grafting of the hydrolysis product, oxidation of monomer and excessive deactivation of the initiator. Due to the above-mentioned undesired side reactions, no apparatus has, before now, to our knowledge, been developed for the efficient continuous vinyl grafting of cellulosic webs.

We have discovered a grafting apparatus which operates efficiently in the production of a grafted cellulosic web. This apparatus enables the continuous, uniform grafting of vinyl-type monomers onto cellulosic materials on a commercial scale. Additionally, the final grafted product produced by the apparatus of this invention is high in quality in respect to the percentage and completeness (evenness) of grafting. Also, since continuous grafting is now possible, our apparatus enables the production of a large quantity of a high quality product at a total cost which will still be commercially feasible.

It is an object of this invention to provide an apparatus for the continuous uniform vinyl grafting of cellulosic materials.

It is another object of the present invention to provide an apparatus for the continuous uniform vinyl grafting of cellulosic webs which may be operated continuously without the formation of a substantial amount of vinyl homopolymer or other undesired compounds.

These and other objects of the present invention will become more apparent to those skilled in the art upon reading the more detailed description set forth hereinbelow.

It will be obvious to one skilled in the art that only the minimum amount of details and component parts of the apparatus are set forth in the drawing in order to describe the invention and for sake of simplicity.

According to our invention there is provided an apparatus for the continuous, uniform grafting of a cellulosic material which comprises an enclosed treatment tank, a first inlet conduit in said treatment tank means on the end of said first inlet conduit for uniformly distributing liquid throughout said treatment tank, a first outlet conduit in said treatment tank, heating means adapted for heating a liquid present in said treatment tank, a second inlet conduit adapted for passage of gas therethrough into said treatment tank, a second outlet in said treatment tank, adapted for the removal of gas therefrom, means adapted to maintain the oxygen in said tank at predetermined concentration, a third inlet conduit in said treatment tank adapted for the passage of cellulosic material into said treatment tank, guiding means in said treatment tank positioned so as to cause cellulosic material to flow substantially the complete length of said treatment tank beneath the surface of liquid present therein, a third outlet conduit for removal of cellulosic material from said treatment tank, means for causing cellulosic material to move through said treatment tank, circulation means adapted to control the flow of liquid through said treatment tank, and means for controlling the concentration of the active liquors in said treatment tank.

In order to set forth the method for operating our apparatus in a continuous reaction, referring now to FIGURE 1 of the drawing, an aqueous solution or emulsion of a vinyl monomer from holding tank 10 is metered through line 12 by pump 14 and admixed with an acidic initiator solution pumped from holding tank 16 by pump 20. For sake of example, the aqueous solution or emulsion of monomer will comprise water, and ethyl acrylate or water, ethyl acrylate and an emulsifying agent and the acid initiator solution will comprise ceric ammonium nitrate and nitric acid. During the continuous reaction, the blend of monomer and initiator is pumped through line 18 into an external circulation loop comprising line 19, heater 22, line 23, rotometer 24, line 25, tank 28, variable speed pump 30 and line 32.

This external circulating loop is used to provide suitable and controlled circulation of liquid across the tank 28 and adequate temperature control of the liquid bath in the tank. The volume of liquid circulated in the circulating loop is significantly greater than the volume of liquid make-up added from the monomer and catalyst holding tanks, 10 and 16, respectively. Turbulence, in the external circulating loop caused by variable speed pump 30, also acts as a means of maintaining the emulsion.

Liquid distributors 26 distribute the monomer-initiator stream into the tank such that suitable turbulence will be provided across the reaction bath. A turbulent flow of the monomer-initiator mixture must be continually effected in tank 28 because any separation of the ethyl acrylate from the emulsion in any stagnant areas within the tank may result in the homopolymerization of the ethyl acrylate. The turbulence caused by the distributors helps maintain a suitable liquid circulation and thereby, in addition to the prevention of the undesirable monomer polymerization as mentioned above, keeps the ingredients thoroughly mixed and aids materially in the level grafting of the ethyl acrylate onto the cellulosic material being treated.

A small amount of monomer-initiator mixture is withdrawn from line 32 by pump 36. This withdrawn monomer-initiator mixture is passed via line 38 to purge tank 40 where it is either sent to disposal or recovery units, not shown, via line 41. The rate of withdrawal of the monomer-initiator mixture from line 32 and the rate of addition of monomer-initiator mixture through line 18 is such that the critical concentration of the reaction system in tank 28 is maintained constant.

Nitrogen from tank 42 is passed through line 44 and valve 53 and is admixed with a small amount of air flowing from tank 46 via line 48 and valve 50, in line 52. The mixed gases then flow through line 54 into tank 28. It has been found that a critical oxygen concentration must be present in tank 28 in order to aid in the prevention of the homopolymerization of the vinyl monomer present. Generally, the concentration of oxygen must be from about 0.75% to about 2.1% by volume of oxygen based on the total volume of gases present in tank 28. A more complete discussion of this concept can be found in U.S. application 786,696, filed Jan. 14, 1959 by Nicholas R. Segro.

In order to maintain this critical oxygen concentration in tank 28, an oxygen electrode, or other oxygen sensitive device, is positioned in the tank so that it is immersed in the liquid monomer-initiator mixture. This oxygen electrode 100, preferably a Beckman electrode, is connected via line 102 to recording meter and feedback device 104. This oxygen electrode is of the conventional type and measures the percent or concentration of oxygen present in the monomer-initiator reaction mixture. If the oxygen content of the mixture is too high, less oxygen must be added to tank 28. To accomplish this result, valve 50 would be closed to prevent the influx of more oxygen into the tank. Practically, it is also possible to connect recording meter and feedback device 104 to valves 50 and 53 via dotted lines 106, 120 and 124. The feedback device will then activate valves 50 and 53, which may be solenoid valves, by emitting a signal, and accomplish the desired oxygen reduction automatically. If the oxygen concentration in the monomer-initiator mixture is too low, valve 50 may be opened manually and more oxygen is added, admixed with nitrogen, to tank 28 via line 54. Of course, the oxygen addition may also be controlled automatically upon activation of valves 50 and 53 by signals emitted from recording meter and feedback device 104, as mentioned above in regard to the oxygen reduction. In this manner the ratio of oxygen to nitrogen can be increased or decreased whenever necessary in the total feed gas stream to maintain the oxygen concentration of the monomer-initiator mixture in tank 28 within the critical optimum range.

Oxygen sampling device 112, which may be any commercially available oxygen sensitive unit, is positioned in the treatment tank above the monomer-initiator mixture and measures the amount of oxygen in the atmosphere above the liquid by contact with oxygen analyzer 116 via line 114. Oxygen analyzer 116 is preferably a Beckman para-magnetic oxygen analyzer but any other type of analyzer may be used. This analyzer very accurately measures the concentration of oxygen in the atmosphere above the surface of the monomer-initiator mixture in tank 28. The analyzer may also effect automatic control of the atmosphere in tank 28 in the same manner as described above in regard to recording meter and feedback device 104, reducing or adding gas by activating valves 50 and 53 via lines 118, 124 and 120. It can be seen therefore, that the oxygen content of the atmosphere and of the monomer-initiator mixture is continually controlled manually or automatically. Oxygen analyzer 116 is normally used as a continuous oxygen recorder and to detect any leakage in the tank through which oxygen may be admitted. Recording meter and feedback device 104 is used to determine any fluctuation of the oxygen in the monomer-initiator mixture due to variations in operating conditions or malfunction of the pumping system employed. Since the reaction is carried out at a slight positive pressure, one-way purge vent 110 is employed to relieve the pressure built-up by the addition of more gas. To prevent excessive loss of monomer vapor in the exit gas stream, a major portion of stream may be recycled, with oxygen content and gas flow rate adjusted from tanks 42 and 46, in a manner not shown.

Paper or any other cellulosic material, in web or fiber form, admitted to the treatment tank is represented by line 56. A multiplicity of rollers or other guiding devices are positioned in the treatment tank so as to guide the paper through the tank while it is under going treatment.

The paper is threaded over roller 58 into water dip bath 59 via rollers 60 and 62 and is removed from the bath via roller 64. Baffle 66 is attached to the top and sides of the water dip bath for the entire width thereof and extends downwardly into the water itself. This baffle creates a sealed system thereby materially preventing oxygen from leaking into or out of the treatment tank. The paper continues over roller 68 into tank 28. The paper continually flows substantially the entire length of tank 28 completely immersed in the monomer-initiator mixture guided by rollers 70 and 72.

We have found that it is preferred to have a low liquor to paper ratio in the tank in order to allow less time for the process to come into equilibrium. It must be realized that upon starting up of the apparatus, the monomer and initiator concentrations will decline and level off at equilibrium.

Additionally, the liquid to paper ratio in tank 28 should be maintained low because if a high ratio is maintained, too much of an inventory of vinyl monomer is held and catalyst may be lost due to the production of the cerous compound by reduction of the ceric catalyst. These results obviously are not economically feasible when the apparatus is operating on a commercial scale. The liquid level in the treatment tank 28 can be maintained by the pumping rates of the feed and purge pumping systems in order to assure that there will always be enough liquid in the tank to completely immerse the paper being grafted.

Once the pumping rates of the monomer-initiator stream are set (after the system is in equilibrium) the initiator inlet, monomer inlet, and purge outlet are effectively controlled by the pumping system so that further adjusting becomes substantially unnecessary. The initiator-monomer emulsion in treatment tank 28 is periodically sampled and analyzed so that the concentration of initiator and monomer can be determined. If either one of these concentrations varies from the predetermined level, adjustment of the pumping rates of the feed and withdrawal streams is all that is necessary in order to compensate for the change. Although previous discussion has been limited to the addition of more monomer-initiator stream when the concentration of the liquid in the tank changes, it is also possible that only a portion of either of these streams, i.e. acid, water etc. need be added so as to compensate for any changes in, for example, pH. However, these concentrations or values are not as sensitive to change as those mentioned above and realignment of these values is generally only necessary after the apparatus has been operating for a long period of time.

The grafted paper is removed from tank 28 via rollers 74 and 76 and is washed in acetone wash bath 77 by threading it around rollers 78 and 80. Baffle 84 serves the same purpose as described above in regard to baffle 66. The washed paper is then removed from the acetone wash bath over rollers 82 and 86 and is washed with water in water wash zone 87. Rollers 88 and 90 cause the paper to be immersed in the water to effect removal of any acetone absorbed thereon. Excess acetone may be removed from the paper by steaming, with the acetone being recovered and subsequently reused, by incorporating a steam treatment zone between acetone wash bath 77 and water wash zone 87. The grafted paper product is removed from the system over roller 92 as represented by line 94 and is taken up on roller 96. Motor 98 is attached either electrically or mechanically to roller 96 and other rollers in the apparatus to adequately control the paper feed rate throughout the system.

Internal squeeze rolls, not shown, may be positioned throughout the apparatus to minimize liquid carry-over on the paper from zone to zone.

The residence time of the cellulosic web in tank 28 is important in order to achieve the desired degree of grafting of the vinyl monomer thereon. Depending upon the vinyl monomer utilized, the cellulosic web, the initiator, the temperature etc., the residence time of the web will vary. However, it is a relatively simple task to determine the residence time by carrying out an initial run before setting the apparatus up for commercial production to determine just how much grafting occurs with the particular web, initiator etc. being utilized. Adjustment of the concentration of any of these components of the system can then be accomplished to produce the desired grafting efficiency. In this way, effective grafting of the paper can be achieved in the minimum amount of time and at a maximum efficiency.

Figure 2:
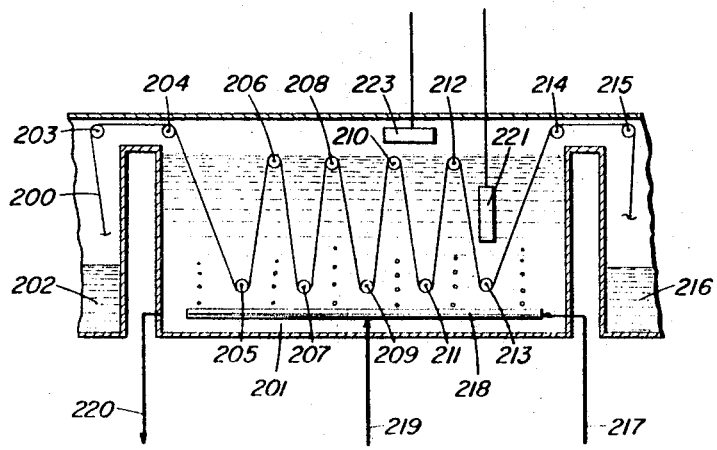

FIGURE 2 of the drawing discloses a modification of the treatment tank wherein the residence time of the cellulosic web can be varied in order to effect the degree of contacting of the web with the grafting solution.

FIGURE 2 represents a tank modification wherein various staggered rollers are substituted for rollers 70 and 72 of FIGURE 1. In this figure, cellulosic material represented by line 200 is threaded into treatment tank 201 from water dip bath 202 over roller 203. Rollers 204 to 214 are positioned in tank 201 so as to create a long residence time in the tank for the cellulosic web undergoing grafting. After being threaded around the last roller 214, the web is withdrawn from tank 201 over roller 215 and then into acetone was bath 216. In this modification the initiator-monomer stream can be added to the tank via line 217 and distributor 218 which consists of an elongated tube having holes in the upper portion thereof through which the liquid may flow. The initiator-monomer liquid is withdrawn from the tank via line 220. The nitrogen-air stream may be added via line 219 and be distributed by the same distributor 218 as distributes the monomer-initiator stream. Oxygen electrode 221 and oxygen sampling device 223 are positioned similar to the corresponding instruments 100 and 112, respectively, in FIGURE 1.

In respect to the reaction conditions maintained in the treatment tank, the grafting may be carried out at temperatures between about −5° C. and 100° C. but preferably at temperatures between about 10° C. and 60° C. Although the process may be carried out under atmospheric pressure, a slight positive pressure is preferred in order to reduce the possibility of leakage of oxygen into the system. The pH of the monomer-initiator system must be maintained at a value below about 3.5. This pH is maintained by addition of various inorganic acids to the initiator-monomer mixture in the catalyst feed tank.

The amount of initiator which is utilized in the practice of the process of the present invention may be varied over fairly wide limits. For example, one may utilize from about $10^{-6}$ to 1 mole of ceric ion per mole of polymerizable monomer. Preferably, one would use between $10^{-3}$ to $10^{-1}$ mole of ceric ion per mole of polymerizable monomer. Ceric ion is preferably introduced into the reaction mixture according to the present invention in the form of a ceric salt. Among the salts adapted for use in the present invention are ceric nitrate, ceric sulfate, ceric ammonium nitrate, ceric ammonuim sulfate, ceric ammonium pyrophosphate, ceric iodate, ceric salts of organic acids, e.g., cerium naphthenate and cerium linoleate and the like. These compounds may be employed singly or in combination with one another. Ceric compounds which are capable of forming ceric salts in situ under the acid conditions of the coplymerization reaction such as ceric oxide, ceric hydroxide and the like may also be used.

In the practice of the process of the present invention, when an aqueous emulsion technique is used, one will choose to make use of an emulsifying agent of which there are many known in the art. Inasmuch as the process practiced in the apparatus of the present invention, including the aqueous emulsion processes, are preferably carried out at pH values not greater than 3.5, it is preferred to make use of those emulsifying agents which do not tend to precipitate from an acid medium particularly, one within the pH range of operation and in addition, agents which are inert to the oxidation character of ceric ion. The amount of emulsifying agent used will depend in some measure on degree of water solubility of the components used in the reaction, namely, the ethyl acrylate monomer, the cellulosic material and the ceric salt. At any rate, the amounts conventionally used as a range will find adequate application in the practice of the present invention.

Generally the reaction process is carried out as set forth in U.S. Patent 2,922,768, patented Jan. 26, 1960, with the emulsifying agents disclosed therein also being applicable in the present invention.

What is claimed is:

1. In a method for the continuous, uniform, liquid emulsion grafting of a vinyl monomer onto the exposed faces of a cellulosic material wherein the reaction is conducted at a temperature ranging from about −5° C. to about 100° C. and in the presence of from about $10^{-6}$ to about one mol of an initiator per mol of vinyl monomer and from about 0.75% to about 2.0%, volume, based on the total volume of gases present, of oxygen, and a pH of not greater than about 3.5, the improvement which comprises continually adding sufficient monomer-acidic initiator mixture to the reaction media so as to maintain said initiator concentration and pH within their respective ranges, continually withdrawing a portion of said monomer-initiator mixture, maintaining said withdrawn portion within said temperature range and returning at least part of said heated portion to said reaction media at such a viscosity so as to cause turbulence of said media and thereby maintain the emulsion stable, continually measuring the concentration of the oxygen in the liquid and the gases in and around said reaction media and adjusting the addition of oxygen in response to said measurings, so as to maintain said concentration thereof, continuously adding said cellulosic material to said reaciton media, continuously causing said material to flow subsurface to said reaction media and continuously recovering grafted cellulose material.

References Cited

UNITED STATES PATENTS

| | | | |
|---|---|---|---|
| 1,271,599 | 7/1918 | Messer | 8—142 |
| 1,399,230 | 12/1921 | Touchstone et al. | 8—151 |
| 1,545,091 | 7/1925 | Flowers | 8—142 |
| 1,669,235 | 5/1928 | Fenton | 8—142 |
| 2,382,726 | 8/1945 | Korte et al. | 8—108 |
| 2,071,922 | 2/1937 | Drobile et al. | 8—151 |
| 2,591,179 | 4/1952 | McBean | 8—158 |
| 2,739,091 | 5/1956 | Engstrom et al. | 8—116 X |
| 2,768,869 | 10/1956 | Creswick | 8—158 |
| 2,905,522 | 9/1959 | Fahringer | 68—207 |
| 2,927,871 | 5/1960 | Mancke et al. | 134—10 |
| 3,046,078 | 7/1962 | Salsbury et al. | 8—116 |
| 3,091,109 | 5/1963 | Clement et al. | 68—177 |
| 3,091,508 | 5/1963 | Edwards | 8—142 |
| 3,101,240 | 8/1963 | Mathews | 8—142 |
| 3,128,617 | 4/1964 | Maynard | 68—177 |
| 3,148,019 | 9/1964 | Gallagher et al. | 8—111 |
| 3,213,470 | 10/1965 | Yosowa et al. | 68—177 |
| 3,032,518 | 5/1962 | Sergo | 260—17.4 |
| 3,065,041 | 11/1962 | Suen. | |
| 2,922,768 | 1/1960 | Mino et al. | 8—116 |
| 3,130,076 | 4/1964 | Gruber et al. | 8—116 |

OTHER REFERENCES

Landells, Journal of the Society of Dyers and Colorists, vol. 67, pp. 338–342 (1951).

NORMAN G. TORCHIN, Primary Examiner

J. CANNON, Assistant Examiner

U.S. Cl. X.R.

117—93.31